(12) United States Patent
Jole

(10) Patent No.: US 7,700,705 B2
(45) Date of Patent: Apr. 20, 2010

(54) LATEX ACCELERATOR COMPOSITION

(75) Inventor: Evert Van Jole, Louvain-La-Neave (BE)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 11/997,842

(22) PCT Filed: Jul. 26, 2006

(86) PCT No.: PCT/EP2006/064653

§ 371 (c)(1),
(2), (4) Date: Jun. 4, 2008

(87) PCT Pub. No.: WO2007/017375

PCT Pub. Date: Feb. 15, 2007

(65) Prior Publication Data

US 2009/0118435 A1    May 7, 2009

(30) Foreign Application Priority Data

Aug. 5, 2005    (EP)    ................................. 05107244

(51) Int. Cl.
*C08F 36/06* (2006.01)

(52) U.S. Cl. .......................... 526/335; 526/86; 526/89; 526/100; 526/346

(58) Field of Classification Search ................ 525/343, 525/232, 192; 526/86, 89, 100, 335, 346
See application file for complete search history.

(56) References Cited

U.S. PATENT DOCUMENTS 2,684,391 A * 7/1954 Jones .................... 524/575.5

FOREIGN PATENT DOCUMENTS

| GB | 1 211 938 | * 11/1970 |
| GB | 1211938 | 11/1970 |
| GB | 1265626 | 3/1972 |
| WO | 02/049430 A1 | 11/2002 |
| WO | WO 02/090430 A1 * | 11/2002 |
| WO | 03/072340 A1 | 4/2003 |
| WO | 2005/035589 A2 | 4/2005 |

OTHER PUBLICATIONS

Chakaraborty, K.B., et al., "Safer accelerators for the latex industrie", LATEX 2004, Apr. 21, 2004, XP00805572, Hamburg.

* cited by examiner

*Primary Examiner*—Ling-Siu Choi
(74) *Attorney, Agent, or Firm*—Kraton Polymers U.S. LLC; Novak, Druce & Quigg

(57) ABSTRACT

Accelerator composition for a rubber latex derived from a conjugated diene and optionally a vinyl aromatic comonomer comprising: (i) a diethyl dithiocarbamate (like e.g. ZDEC), and (ii) diphenylguanidine (DPG), and substantially free of any thiazole derivative, a curable aqueous synthetic rubber latex composition comprising said accelerator composition, and a process for the water-based solvent-free manufacture of synthetic shaped synthetic elastomeric articles, prepared by using said accelerator composition.

15 Claims, No Drawings

LATEX ACCELERATOR COMPOSITION

TECHNICAL FIELD

The invention relates to the field of shaped elastomeric articles derived from a curable elastomer latex composition.

More in particular the present invention relates to improvements to the process of making elastomeric articles and a latex accelerator composition to be used therein.

The shaped elastomeric articles are more in particular made from a curable poly(isoprene) latex composition and are in particular used for medical, health care and personal hygiene applications.

BACKGROUND ART

The manufacturing process for producing elastomeric articles from natural or synthetic rubber latex involves a curing step during which cross linking or vulcanisation occurs through sulphur groups between the polymer units.

Conventional processes for making elastomeric articles from natural or synthetic latex typically involve preparing a latex precompound, dispersion or emulsion, obtained by mixing latex, sulphur, an activator and an accelerator system, maturation for a certain period, dipping a former in the shape of the article to be manufactured into a coagulant and subsequently into the latex precompound and curing the latex present on the former.

Desirable properties of certain elastomeric articles such as tensile strength are substantially affected by the cross linking and curing stages of the manufacturing process.

The use of sulphur or sulphur containing compounds as vulcanising agent and zinc oxide as activator, the use of mixtures of inorganic salts (calcium nitrate, calcium carbonate and surface active agents) as a coagulator, and the use of vulcanising or sulphur cross linking accelerator compositions in the manufacture of rubber articles, is well known.

Conventional vulcanisation accelerators include dithiocarbamates, thiazoles, guanidines, thioureas and sulphenamides.

Certain fields, in which elastomeric articles are needed, such as the medical, health care or personal hygiene field, utilized specific types of equipment and processing techniques which enables the specific performance and regulatory requirements of the particular article produced.

The use of natural rubber latex in the manufacture of certain article such as medical gloves has been associated with disadvantageous properties such as allergic reactions, generally believed to be caused by natural proteins or allergens present within the natural rubber latex and the final product.

Synthetic elastomeric products and manufacturing processes which altogether reduce or avoid the likelihood of potential adverse reactions of the user or wearer, are of increasing interest in the medical field, particularly in the field of gloves.

A majority of glove manufacturing processes are water-based dipping systems.

It is generally known that solvent-based systems can possibly be used for poly(isoprene) and other elastomers although such solvent-based systems are poorly suited for the manufacture and molding of elastomeric articles for medical applications. One difficulty in the field of gloves for example is the design of processes and materials which will produce a thin elastomeric article having desirable properties such as high tensile strength. Another disadvantage of solvent-based systems is solvent toxicity.

Process and materials that would obviate or reduce the need for the use of toxic solvents, while at the same time yielding a product having desirable properties for medical applications, are thus still being explored.

More recently a process was proposed (WO 02/090430) for the manufacture of elastomeric poly(isoprene) articles such as medical gloves, condoms, probe covers, catheters, comprising the steps of:
1. preparing an aqueous latex composition containing an accelerator composition and a stabilizer, said accelerator composition comprising a dithiocarbamate, a thiazole and a guanidine compound;
2. dipping a former into said compounded latex composition; and
3. curing said compound latex composition on said former to form said elastomeric poly(isoprene) article.

Preferably said accelerator composition comprised zinc dietnyidithiocarbamate, (ZDEC), zinc-2-mercaptobenzothiazole (ZMBT) and diphenylguanidine (DPG).

Although the use of said accelerator composition represented an improvement of the manufacturing process, it has been found that all these accelerators in the up till now applied concentrations are capable of producing Type IV allergic response in human beings and may also possess increasingly unacceptable eco-tox and acute toxicity profiles in the concentrations used until now. In addition ZDEC and ZMBT have beers found to produce potentially harmful N-nitrosamines as is known from e.g.

"Safer Accelerators for the Latex industry", Sakroborty K. B. and Couchman R., Latex 2004, Hamburg, 20-21 Apr. 2004, p. 75-87 and in particular p. 75 and 76. From the same publications (p. 82) were also known accelerator compositions which comprised ZDEC, MBT and DPG in amounts to provide concentrations in the latex to be cured of 1.0, 1.0 and 0.5 phr of dry rubber respectively.

Another characteristic of said accelerator compositions was that actually a stabilizer had to be used in conjunction with said accelerator composition to prolong the stability or pot-life of the procured poly(isoprene) latex.

Moreover, from WO 2005/035539A2 accelerator compositions for synthetic poly(isoprene) were known which comprised a dithiocarbamate and thiourea and preferably in addition a thiazole. As preferred dithiocarbamate component was mentioned 1,3-dibutyl thiourea.

A clear teaching in said document is that preferred accelerator systems did not contain tetramethylthiuram disulfide or diphenylguanidine.

From U.S. Pat. No. 2,684,391 the use of a vulcanising accelerator, comprising a metal salt of an N-substituted dithiocarbamic acid and a small proportion of an amine, relative to the dithiocarbamate, was known. As preferred amounts of said amine were specified from 2% to 25% by weight of the dithiocarbamate in the accelerator. As a preferred dithiocarbamate zinc diethyl dithiocarbamate was used and as preferred amine component diphenylguanidine was used. Moreover, it was stated that the diethyl dithiocarbamate could be mixed with another dithiocarbamate accelerator.

From GB-1211938 was known a process for the production of natural or synthetic cellular rubber or a blend thereof, which comprised beating a mixture comprising foamed rubber latex, vulcanising agent and gelling agent (having been added to the already foamed latex), by means of a high frequency dielectric heating to a temperature below 100° C. so that, there is substantially no evolution of steam, thereby gelling the foamed rubber latex and then vulcanising the gelled rubber latex foam thus obtained in the absence of high frequency dielectric heating.

An accelerator system which comprised zinc diethyl dithiocarbamate, diphenylguanidine and zinc-2-mercapto benzothiazole, was used, wherein the specified weight ratio of phenylguanidine relative to the weight of unsaturation. Said accelerator system comprised at least two different dithiocarbamates, one of the components being zinc diethyl dithiocarbamate, a thiazole and a guanidine such as diphenylguanidine. No reference was actually made to coagulant dipping.

From WO 03/072340 an poly(isoprene) article was known which comprised a poly(isoprene) latex, a curing compound comprising sulpher, a thiuram compound and a second compound, which inter alia could be xanthogen sulfide plus zinc dibenzyl dithiocarbamate or diisopropyl xanthogen plus zinc dibenzyl dithiocarbamate. A preferred second compound component was zinc dibenzyl dithiocarbamate. Moreover, said document actually taught in par. [0019] that the surface of condoms prepared from poly(isoprene) formulations, including ZDEC and ZBDC, was inferior.

It will be appreciated that there is still a strong need for an improved manufacturing process for gloves etc. from synthetic rubber latex, providing films from a stable precompound of latex, showing the required mechanical properties (tensile strength $\geq 17$ MPa; elongation at break $\geq 650\%$) within a cycle time of 1 day, by using less amounts of vulcanising agent and in particular sulphur, a safe accelerator system and a maturation time from some hours to less than 2 days.

As result of extensive research and experimentation said improved manufacturing process and acceleration system to be used therein, have surprisingly been found.

DISCLOSURE OF THE INVENTION

Accordingly, the present invention relates to an accelerator composition for a latex rubber, derived from a conjugated diene and optionally a vinyl aromatic comonomer, containing:

(i) a diethyldithiocarbamate, and
(ii) diphenylguanidine (DPG), and which is substantially free of any mercaptobenzothiazole or salts thereof.

Another aspect of the present invention is formed by a curable aqueous synthetic rubber latex composition, comprising a synthetic rubber latex, a vulcanising agent, an activator and an accelerator system as specified hereinbefore.

it will be appreciated that the accelerator compositions according to the present invention do not contain any thiazole derivative and more in particular any mercaptobenzothiazole, e.g. in the form of its zinc salt (ZMBT).

It will be appreciated that still other aspects of the present invention are formed by a process for the water-based manufacture of synthetic elastomeric articles from a curable synthetic rubber latex composition as defined hereinbefore, and by shaped synthetic elastomeric articles prepared from the hereinbefore specified curable aqueous synthetic rubber latex compositions.

Applicants have actually provided an improved two-component accelerator composition for sulphur cross linkable latex of a synthetic rubber, which can be used with latex in a process for making elastomeric articles, having the desirable properties (e.g. tensile strength) and more in particular articles for medical applications such as surgical and examination gloves, medical devices (catheters) and food contact and child related products (nipples and pacifiers). Said process has been found to enable an economic water-based process, without the need for new costly additional materials or equipment and with lesser amounts of vulcanising agents and stabilizers, and providing economically attractive maturation times.

DETAILED DESCRIPTION OF THE INVENTION

The curable aqueous synthetic rubber latex compositions according to the present invention comprise a synthetic rubber latex, a vulcanising agent, an activator and an accelerator system. In particular said aqueous rubber latex may be derived from poly(isoprene), poly(butadiene), poly(chloroprene), poly(neoprene), styrene-isoprene copolymers having a substantially random structure or containing detectable blocks of one or more comonomers. The backbone of the polymer or copolymer may be straight or branched but is preferably straight. Most preferred is a poly(isoprene) latex as poly(isoprene) is one of the preferred polymers due to its chemical similarity to natural rubber, as well as its physical properties such as feel, softness modulus, elongation at break and tensile strength.

Poly(isoprene) latex, poly(butadiene) latex, poly(styrene/isoprene) latex, poly(styrene/butadiene) latex, to be used as mayor component of the pre-cure latex composition, are readily available and can be obtained from KRATON Polymers Inc., USA and KRATON Polymers B.V., the Netherlands: Apex Medical Technologies Inc., USA and Aqualast E 0501 is available from Lord Corporation, USA.

in addition to poly(isoprene), poly(isoprene) copolymers and poly(isoprene) blends can be used as well. Suitable poly(isoprene) blends can include e.g. poly(conjugated diene) and copolymers comprising styrene and thermoplastic material such as polyurethane and the like. A preferred poly(isoprene) latex is KRATON IR-401 latex.

It will be appreciated that the accelerator compositions as specified hereinbefore and to be used according to the present invention, can also be applied on natural rubber latices from which the undesired accompanying proteins have been substantially eliminated (modified natural rubber latices).

According to a preferred embodiment of the accelerator composition of the present invention the weight ratio of compounds (i) and (ii) is in the range of from 0.80 to 1.50 and most preferably from 0.90 to 1.10.

According to a preferred embodiment of said latex composition, the component (i) occurs in a concentration of from 0.25 to 0.50 phr and the component (ii) in the range of from 0.20 to 0.50 phr, relative to the weight of synthetic rubber solid. More preferably concentrations of these components (i) and (ii) are in the range of from 0.40 to 0.50 phr and from 0.40 to 0.50 phr of dry rubber respectively.

It has been surprisingly found that smaller concentrations of vulcanising agent (e.g. sulphur) can be applied in the latex composition, in comparison to other prior art accelerator systems. Concentrations of vulcanising agents in the range of from 0.50 to 0.90 phr have found to be successfully applied, while maintaining the physical properties of the final rubber products (vulcanisate).

The hereinbefore specified concentrations of DPG have been found to be critical as in comparative experimentation with accelerator compositions without any DPG, long maturation times of the precured latex compositions in order to obtain reasonable mechanical properties, were found to be unacceptable for industrial processing.

Another advantage of the present invention is that conventional manufacturing equipment and most readily available materials can be used in accordance with the invention to make the synthetic rubber and preferably poly(isoprene) glove without the need for new or costly additional materials or equipment. No complicated new process steps are required by the invention, due to the improved maturation time and storage stability.

Another advantage of the present invention is that ready to use poly(isoprene) latex compositions, formulated in accordance with the invention, exhibit prolonged storage stability, i.e. without undesired coagulation. The use of an additional stabilizer is not necessary. For example, the pre-cure storage stability of the compounded poly(isoprene) latex composition (i.e. the time period prior to the use of the complete poly(isoprene) latex composition in the dipping and curing steps) can extend to 8 days. With such an extended storage life of the latex, the amount of waste latex can be significantly reduced and greater flexibility in scheduling manufacturing processes is permitted.

Another aspect of the present invention is formed by a process for the water-based manufacture of synthetic elastomer articles, comprising the preparation of a latex dispersion or emulsion, comprising a vulcanising agent, an activator and an accelerator system, maturation of the latex dispersion for a period of from 0.5 to 1.5 days, dipping a former in the shape of the article into the latex and curing the latex, present on the former.

An advantage of the process of the present invention and the curable aqueous synthetic rubber latex composition to be used therein, is the economically attractive maturation time period and temperature, as well as the dipping temperature. Accordingly, significant cost and resource advantages are provided over conventional manufacturing processes. More in particular, a maturation time period, varying from 12 to 36 hours and preferably from 18 to 24 hours, can be used and processing temperatures of less then 35° C. and in particular from 15 to 35° C. can be used.

The invention also provides for synthetic elastomeric articles made by the hereinbefore specified process.

Elastomeric articles made by said process can exhibit tensile strengths of over 17, as measured according to ASTM D-412, and elongation at break values of at least 750%.

If desired a stabilizer, which is not necessary in principle, can be used in certain special circumstances. Any stabilizer known in the art as useful in curable latex systems can be used, provided it is compatible with the other ingredients and provides the desired function, i.e. prolongs stabilization of the pre-cure compounded poly(isoprene) latex. A variety of stabilizers can be used including but not limited to, milk protein salts, anionic surfactants such as sodium lauryl sulphate and sorbitan fatty acid esters. Milk protein salts are preferred as possible stabilizer. In particular alkaline earth metal caseinate salts are preferred, such as sodium caseinate, potassium caseinate, manganese caseinate and zinc caseinate, and combinations thereof. Other possible stabilizers can be selected from sodium lauryl(3)sulphate, branched sodium dodecylbenzene and sorbitan fatty acid ester surfactants, such as polyoxyethylene sorbitan fatty acid esters.

The curable aqueous synthetic elastomer composition according to the present invention may in addition to synthetic elastomer latex, accelerator composition, curing agents such as sulphur, organic sulphides or other sulphur donor compounds, comprise activators such as alkaline earth metal oxides, such as zinc oxide, and antioxidants such as WINGSTAY or AQUANOX (tradenames) (e.g. butylated reaction product of p-cresol and dicyclopentadiene (DCPD)).

It will be appreciated that the attractive advantageous properties of the shaped articles prepared from the aqueous latex compositions, could certainly not be expected by a person skilled in this specific art, on account of the disclosures and teachings of the hereinbefore discussed publications alone or combinations thereof.

The invention is useful in manufacturing processes for elastomeric articles composed of poly(isoprene). The invention affords the ability to produce synthetic poly(isoprene) articles which closely mimic the physical properties of elastomeric articles made from natural rubber latex. The invention can be advantageously incorporated info the manufacturing of surgical gloves, condoms, probe covers, dental dams, finger cots, catheters, and the like.

Mode(s) for Carrying out the Invention

The invention has been described with reference to various specific and preferred embodiments and techniques. However, it should be understood that many variations and modifications can be made while remaining within the spirit or scope of the invention as defined by the claims set forth below.

Preparation of a Preferred Poly(Isoprene) Latex Pre-Compound Composition

The preferred poly(isoprene) latex pre-compound composition in accordance with the present invention can be prepared using the following general procedure:

Poly(isoprene) latex (typically 60 wt % solids) is stirred at 25° C. The pH can be adjusted to a range of from 9.5 to 10.5 by the addition of 0.2 phr KOH. Sulphur is added, followed by zinc oxide and accelerator components. The accelerator components ZDEC and DPG are added in ratios ranging from 0.25:0.25 phr to 0.50:0.50 phr dry weight per 100 parts poly(isoprene), Aquanox (antioxidant) is then added and the mixture is stirred for approximately 10 minutes. The obtained latex composition is preferably stored at ambient temperature ranging from about 15° C. to about 25° C. At these temperatures the poly(isoprene) latex composition can be stored for periods lasting up to about 8 days prior to its use in the dipping and curing process.

Preparation of a Poly(Isoprene) Glove

Initially, the pH of the poly(isoprene) latex pre-compound composition can be adjusted to a pH of approximately 10. A glove former is pre-heated in an oven to a temperature of about 70° C. and then dipped in a pre-prepared coagulant composition at a temperature of about 55° C. for a period of time and then removed there from. Next, the coagulant-coated former is placed in a drying oven at 50° C. to 70° C. for a time sufficient to dry the coagulant, typically about 5 minutes.

The coagulant-coated former is removed from the oven and dipped into the poly(isoprene) latex pre-compound at ambient temperature, or at a temperature ranging from about 15° C. to about 30° C. The coated former is removed and placed in an oven at a temperature of about 50° C. to 70° C. for about 1 minute. The glove and former are removed from the oven and placed into a water leaching tank having a temperature of about 40° C. to 70° C., for about 5 to 20 minutes. The glove and former are removed from the leaching tank and placed drying at about 50° C. to 70° C. for a period sufficient to dry the glove, typically about 5 minutes. This is the end of the first curing stage.

At the second curing stage, the glove and former are placed in an oven heated to a temperature of about 100° C. to 120° C. for about 20 to 30 minutes. The glove and former are removed and cooled to ambient temperature. Finally, the glove is stripped from the former.

The gloves can be further treated in accordance with the particular needs, such as using lubrication, coating, halogenation, and sterilization techniques, all of which are conventional. Other conventional steps can be incorporated into the general process as well.

When prepared in accordance with the invention, elastomeric articles such as gloves exhibit the following physical properties: tensile strength of greater than about 17 MPa, elongation of greater than about 750% at break, and a tensile modulus of less than about 2 MPa at 300% elongation, as measured in accordance with ASTM D-412.

Other elastomeric poly(isoprene) articles can be prepared using processes similar to those described herein, in combination with conventional equipment and techniques readily available in the art. For example, an elastomeric article in the form of a condom, can be prepared using a condom former.

The following example further illustrates the advantages of the invention and should not be construed as limiting the invention to the embodiments depicted therein.

EXAMPLES

Preparation of a dipped sample from a poly(isoprene) latex Poly(isoprene) latex (Kraton IR 401™, having a TSC of about 65%) was stirred at ambient temperature. While under continuous stirring, zinc oxide and sulphur dispersions were added to the mixture. Accelerator compounds ZDEC and DPG were formulated info dispersions and then added. Aquanox L™ was added and the mixture was stirred for approximately 10 minutes. The composition (I) was maintained at a temperature of 25° C. for 24 hours.

According to the same procedure poly(isoprene) latex compositions II-III were prepared; additionally comparative examples IV-V based on state of the art formulation knowbow were prepared in the same way.

In the following table the formulation ingredients and their respective amounts have been specified. All amounts are expressed in parts per hundred dry rubber unless noted otherwise.

TABLE 1

|  | I | II | III | Comp. IV | Comp. V |
|---|---|---|---|---|---|
| KRATON IR-401 latex | 100 | 100 | 100 | 100 | 100 |
| KOH | 0.2 | 0.2 | 0.2 | 0.2 | 0.2 |
| Sulphur | 0.6 | 0.6 | 0.6 | 1.2 | 1.2 |
| Zinc oxide | 0.25 | 0.25 | 0.25 | 0.5 | 0.5 |
| ZDEC | 0.5 | 0.5 | 0.5 | 0.5 | 0.5 |
| ZMBT |  |  |  | 0.5 | 0.5 |
| DPG | 0.25 | 0.25 | 0.5 |  |  |
| Aquanox L | 2 | 2 | 2 | 2 | 2 |
| Maturation time (days) | 1 | 3 | 1 | 7 | 13 |
| MECHANICAL PROPERTIES |  |  |  |  |  |
| Tensile strength (MPa) | 16 | 18 | 18 | 2 | 4 |
| Modulus at 300% elongation (MPa) | 0.8 | 0.8 | 0.8 | 0.4 | 0.5 |
| Elongation at break (%) | 1400 | 1400 | 1400 | 1900 | 1700 |

A glass tube was dipped into a coagulant composed of calcium nitrate 30%, isopropanol 54.5%, distilled water 15% and wetting agent (Dresinate 214) 0.5% for a period of about 5 seconds and then removed. The coagulant coated former was dried at ambient temperature for a period of about 30 minutes.

The coagulant coated former was dipped into the compounded poly(isoprene) latex precompound of Formula (I) at a temperature of 20° C. for a period of 15 seconds. The coated former was removed and allowed to dry at room temperature for about 30 minutes.

Subsequently, the former was placed in a water leaching bath at 50° C. for a period of 30 minutes and removed. The former was placed in a pre-heated oven at 50° C. to 70° C. for a period of about 30 minutes to dry. Then the former was placed into a second stage curing oven at 100° C. for a period of about 20 minutes.

The former was removed from the oven, allowed to cool down to room temperature and gently removed from the former.

What is claimed is:

1. An accelerator composition for a synthetic rubber latex, derived from a conjugated diene and optionally a vinyl aromatic comonomer, containing:
   (i) a diethyldithiocarbamate, and
   (ii) diphenylguanidine (DPG) and substantially free of any thiazole; and wherein the weight ratio (i)/(ii) of components (i) and (ii) is in the range of from 0.80 to 2.00.

2. The accelerator composition of claim 1, wherein the weight ratio of components (i) and (ii) is in the range of from 0.80 to 1.50.

3. A curable aqueous synthetic rubber latex composition comprising a rubber latex, a vulcanising agent, an activator and as the only accelerator the composition of claim 1.

4. A curable aqueous synthetic rubber latex composition comprising a rubber latex, a vulcanising agent, an activator and as the only accelerator the composition of claim 2.

5. The curable aqueous synthetic rubber latex composition of claim 3 wherein the rubber latex is a poly(isoprene) rubber latex.

6. The curable aqueous synthetic rubber latex composition of claim 4 wherein the rubber latex is a poly(isoprene) rubber latex.

7. The curable aqueous synthetic rubber latex composition of claim 3 wherein the ingredient (i) is present in a concentration in the range of from 0.25 to 0.50 phr and the ingredient (ii) is present in a concentration in the range of from 0.20 to 0.50 phr, relative to the weight of synthetic rubber solid.

8. The curable aqueous synthetic rubber latex composition of claim 5 wherein the ingredient (i) is present in a concentration in the range of from 0.25 to 0.50 phr and the ingredient (ii) is present in a concentration in the range of from 0.20 to 0.50 phr, relative to the weight of synthetic rubber solid.

9. The curable aqueous synthetic rubber latex composition of claim 3 wherein the vulcanising agent concentration is in the range of from 0.50 to 0.90 wt %, relative to the weight of synthetic rubber solid.

10. The curable aqueous synthetic rubber latex composition of claim 5 wherein the vulcanising agent concentration is in the range of from 0.50 to 0.90 wt %, relative to the weight of synthetic rubber solid.

11. A process for the water-based manufacture of synthetic elastomeric articles, comprising:
    (i) the preparation of a latex dispersion or emulsion comprising a vulcanising agent, a catalyst and the accelerator system of claim 1;
    (ii) maturation of the latex dispersion for a period of from 0.5 to 1.5 days; dipping a former in the shape of the article into the latex; and
    (iii) curing the latex present on the former.

12. Shaped synthetic elastomeric articles, prepared from the curable aqueous synthetic rubber latex compositions of claim 3.

13. Shaped synthetic elastomeric articles, prepared from the curable aqueous synthetic rubber latex compositions of claim 5.

14. Cured shaped synthetic elastomeric articles of claim 12, characterized by a tensile strength of at least 18 MPa (according to ASTM D-412) and an elongation at break of at least 750%.

15. Cured shaped synthetic elastomeric articles of claim 13, characterized by a tensile strength of at least 18 MPa (according to ASTM D-412) and an elongation at break of at least 750%.

* * * * *